United States Patent [19]

Hyatt, Jr. et al.

[11] Patent Number: 5,140,317
[45] Date of Patent: Aug. 18, 1992

[54] ELECTRONIC SECURITY SYSTEM

[75] Inventors: Richard G. Hyatt, Jr.; Charles E. Hall, both of Salem, Va.

[73] Assignee: Medeco Security Locks, Inc., Salem, Va.

[21] Appl. No.: 522,017

[22] Filed: May 11, 1990

[51] Int. Cl.$^5$ .................. E05B 49/00; G06K 5/00; G06F 7/04
[52] U.S. Cl. .................. 340/825.31; 235/382; 70/278
[58] Field of Search .................. 340/825.31, 825.32, 340/64, 533; 235/382; 361/171; 70/278

[56] References Cited

U.S. PATENT DOCUMENTS

| | | | |
|---|---|---|---|
| 3,337,992 | 8/1967 | Tolson | 340/533 |
| 3,926,021 | 12/1975 | Genest et al. | 340/825.31 |
| 4,157,534 | 6/1979 | Schachter | 340/825.31 |
| 4,438,426 | 3/1984 | Adkins | 340/825.32 |
| 4,646,080 | 2/1987 | Genest et al. | 70/278 |
| 4,686,358 | 8/1987 | Seckinger et al. | 235/382 |
| 4,697,171 | 9/1987 | Suh | 361/171 |
| 4,738,334 | 4/1988 | Weishaupt | 340/64 |
| 4,742,426 | 5/1988 | Lavelle | 361/171 |
| 4,789,859 | 12/1988 | Clarkson et al. | 340/825.31 |
| 4,810,861 | 3/1989 | Herriott et al. | 340/825.31 |
| 4,829,296 | 5/1989 | Clark et al. | 340/825.31 |
| 4,835,407 | 5/1989 | Kataoka et al. | 340/825.31 |
| 4,864,292 | 9/1989 | Nieuwkoop | 340/825.31 |
| 4,868,409 | 9/1989 | Tanaka et al. | 70/278 |
| 4,870,400 | 9/1989 | Downs et al. | 340/825.31 |
| 4,962,449 | 10/1990 | Schlesinger | 340/825.31 |

Primary Examiner—Donald J. Yusko
Assistant Examiner—Brian Zimmerman
Attorney, Agent, or Firm—Rothwell, Figg, Ernst & Kurz

[57] ABSTRACT

An electronic security system includes an electronic lock mechanism and an electronic key, each of which is provided with a microprocessor controller and a memory storing data including an ID code. The lock microprocessor changes the ID code stored in its memory upon the operation of the lock by a correct key. The key can only be used to operate the lock once, and thereafter must be reprogrammed by a host computer with the updated ID code for the lock. The electronic lock operates a solenoid which retracts a bolt blocking mechanism which prevents the unlocking of the bolt even when a key having the correct mechanical key cuts is inserted into the lock. Power for operating the electronic lock as well as the solenoid is provided by a power supply within the key.

14 Claims, 7 Drawing Sheets

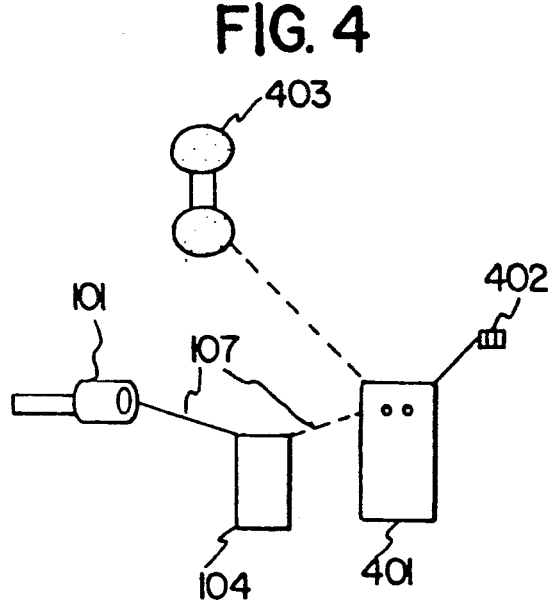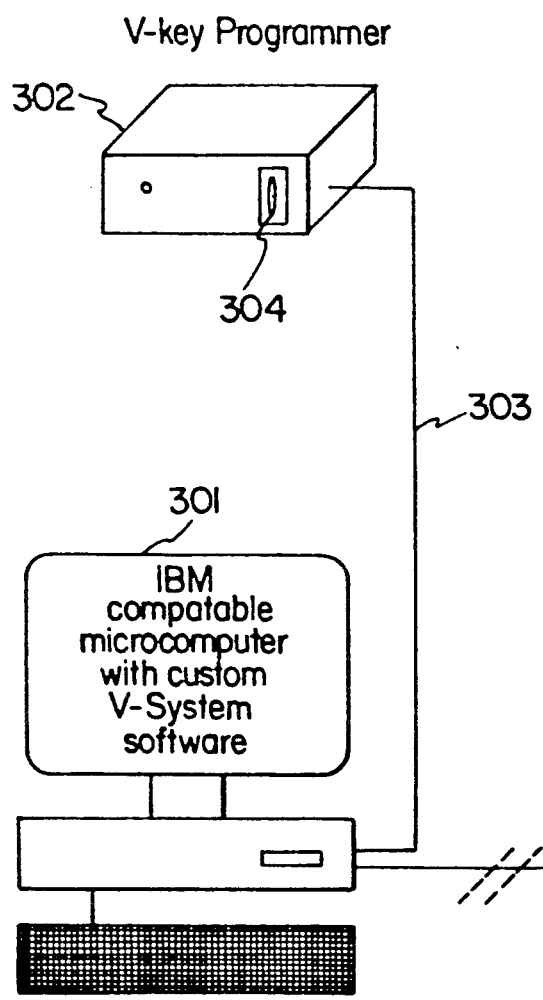

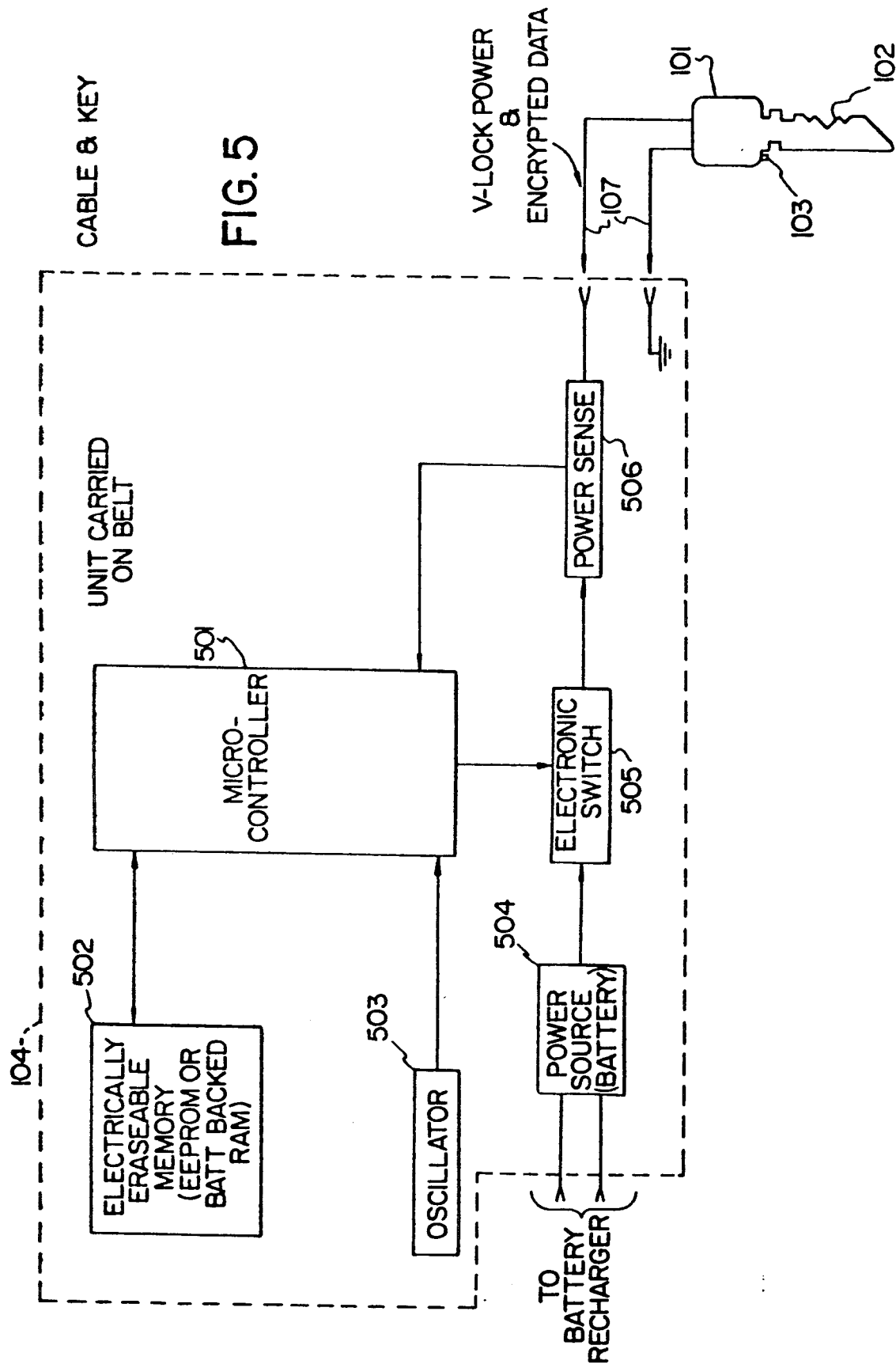

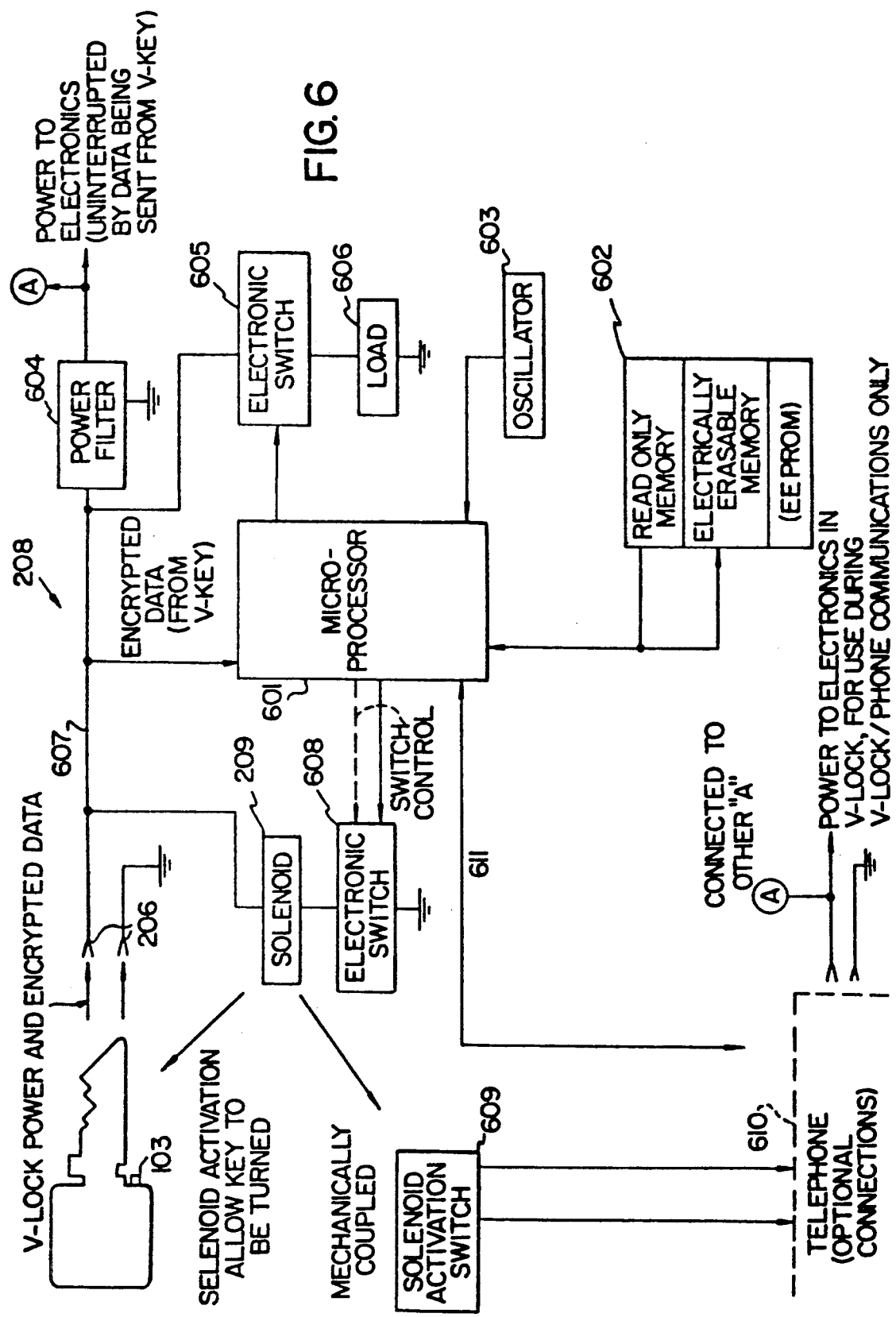

ELECTRONIC SECURITY SYSTEM

BACKGROUND OF THE INVENTION

1. Field of the Invention

This invention relates generally to electronic security systems, and more particularly to electronic security systems for money-containing devices such as pay telephones, vending machines, bill changers or the like, which must be periodically accessed by a collector in order to retrieve the funds accumulated in the device.

2. Background and Prior Art

Typically, the collection of money from coin or currency operated devices such as pay telephones, transit system fare card machines or the like is a costly and burdensome operation. For instance, a company may own tens or even hundreds of thousands of pay telephones for which tens or hundreds of thousands of keys must be kept in order to prevent the loss of a key from requiring the changing of locks on thousands of devices which would operate with the lost key.

Another problem involved with the collection of funds from currency operated devices is the possibility of fraud or theft by a collector. Typically, a collector should remove a locked coin box from the device and replace it with an empty lock box to which he does not have access. However, it is possible that a removed coin box will not be replaced with another lock box but rather will be replaced with an unlocked receptacle which can be later removed by that collector before turning in his key at the end of the collection shift.

Yet another cost involved in the collection process is the sheer manpower required for the task of distributing, collecting, and keeping track of many thousands of keys on a daily basis.

Although electronic security systems are known and have been used for various purposes, see e.g. U.S. Pat. Nos. 4,789,859, 4,738,334, 4,697,171, 4,438,426, applicants are unaware of any which specifically address the problems, noted above.

SUMMARY OF THE INVENTION

The present invention provides an electronic security system which overcomes the problems mentioned above and significantly reduces collection costs.

The present invention also provides an electronic security system which eliminates the requirement of costly rekeying in the event of a key loss.

The present invention further provides an electronic security system which substantially eliminates the possibility of internal fraud and theft.

This invention is an electronic security system comprising a lock including a bolt movable between a locked and an unlocked position, a key actuated lock cylinder having a bolt cam in contact with said bolt to prevent the bolt from moving when in a locked position, and operable upon actuation to move the bolt to the unlocked position, a retractable locking means for preventing the bolt from moving to the unlocked position when unretracted and allowing the bolt to be moved to the unlocked position when retracted, an electrically powered solenoid operable to retract the blocking means upon switching of power thereto, a microprocessor for controlling the switching of power to the solenoid, and a memory coupled to the microprocessor storing coded data.

The invention further includes key means insertable into the lock cylinder for supplying power to the solenoid to retract the blocking means and for actuating the lock cylinder to move the bolt to the unlocked position, including a power supply for supplying power to the solenoid, a controller, a memory storing coded data, and means for establishing electrical connection between the controller and the microprocessor through contact terminals in the lock cylinder for transmission of the coded data, in which the microprocessor includes means for comparing the coded data read from the key means with coded data stored in the coupled memory, and means for enabling the power supply of the key means to power the solenoid when the means for comparing has determined that the coded data from the key means matches the coded data in the coupled memory of the lock.

BRIEF DESCRIPTION OF THE DRAWINGS

The present invention will become more fully understood from the detailed description given hereinbelow and the accompanying drawings which are given by way of illustration only, and are not limitative of the present invention, and wherein:

FIG. 3 is a schematic view of an electronic key programmer according to an embodiment of the present invention;

FIG. 4 is a schematic view of a portable key programmer according to another embodiment of the present invention;

FIG. 5 is a schematic block diagram of the circuit elements of the electronic key of FIG. 1A;

FIG. 6 is a schematic block diagram of the electronic components of the lock mechanism of FIG. 2;

DETAILED DESCRIPTION OF THE PREFERRED EMBODIMENTS

Figure 1A:
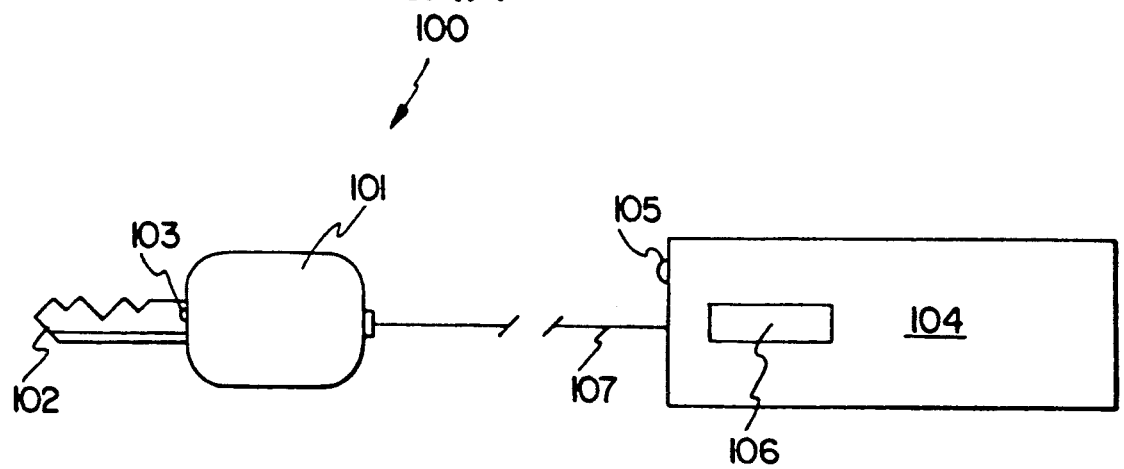
FIGS. 1A and 1B are side and end elevational views, respectively, of an electronic key with its own power supply according to one preferred embodiment of the present invention.
Figure 1B:
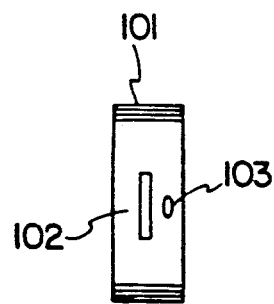

FIGS. 1A and 1B illustrate an electronic key 100 according to an embodiment of the present invention. The key has a key body 101 which contains logic and power transfer circuitry, and a key blade 102 with appropriately cut key bits for operating pin tumblers as is known in the art. The key 100 also carries a spring loaded data and power electrical contact 103, which is made of a suitable material and is preferably gold plated.

Portable battery and logic housing 104 contains a battery power supply and electronic circuitry, a battery charging port 105, a wrist strap or belt clip 106, and a plug-connected cable 107 for transferring power and data signals between the housing 104 and the key body 101.

FIG. 1B is an end view of the key body showing the orientation of the spring loaded contact 103 with relation to the key blade 102. The key 100 and connected housing 104 with their components are portable and are referred to as "key means".

Figure 2:
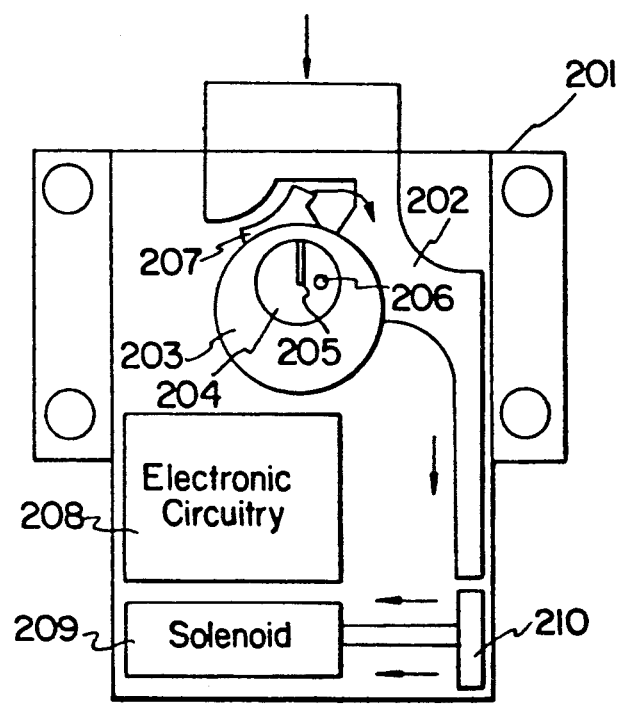
FIG. 2 is a front elevation view of a lock cylinder and associated mechanisms (shown with the housing cover removed) for operation with the key of FIGS. 1A and 1B.

FIG. 2 illustrates a lock cylinder and bolt mechanism according to one embodiment of the present invention, included in a housing 201 (with its cover removed). Within the housing is a bolt 202 operated by a lock cylinder 203 containing a key cylinder plug 204 having a keyway 205 for key blade 102, and an electrical contact 206 which makes contact with the power and data contact 103 of the key body when the key blade 102 is inserted into the key blade opening 205.

A bolt cam 207 is rotated by the lock cylinder 203 to move the bolt 202 between the locked position shown and an unlocked position in which the bolt is withdrawn downward to be substantially within the housing 201. The lock housing 201 further includes electronic logic circuitry 208 and an electrically powered solenoid 209. Solenoid 209 includes a spring biased bolt blocking plunger 210 which, when extended, prevents bolt 202 from being withdrawn by the bolt cam into the housing 201 to its unlocked position. Upon operation of the solenoid 209, bolt blocking plunger 210 is retracted toward the solenoid to enable the key 100 to be turned in the clockwise direction which rotates bolt cam 207 against the bolt 202 and causes the movement of the bolt 202 downward into the housing 201.

FIG. 3 illustrates a programmer for writing data into and reading data from the circuitry in key body 104 through cable 107. The programmer includes a host computer 301 which may be a minicomputer, personal computer, or any other type of computer, but which preferably is an IBM ® compatible microcomputer. A key programmer interface unit 302 is connected to the computer 301 by means of a cable 303 which plugs into a communication port of the computer 301. The programmer interface unit 302 contains a key receptacle 304 having electrical contacts into which the plug end of the key cable 107 is inserted after being disconnected from key body 101 to allow the computer to write into the memory within key housing 104. The computer 301 is loaded with a software program 305 for loading and retrieving files from the key logic housing 104.

FIG. 4 illustrates a portable programmer interface unit 401 including a modem which enables the portable programmer interface unit 401 to communicate with the computer 301 through the public switched telephone network (PSTN) via a standard phone jack 402. In this embodiment, an operator in the field needing to update the contents of files in the key housing 104 would dial up the host computer using a standard phone set 403 which is connectable via a jack to the programmer interface 401. Once communication with the host computer 301 is established, the programmer interface unit 401 operates in the same manner as the office programmer interface unit 302.

FIG. 5 is a schematic block diagram illustrating the components within the electronic key housing 104. The components include a microcontroller or microprocessor 501, an electrically erasable programmable read only memory (EEPROM) 502 coupled to the controller 501, an oscillator or clock 503 which provides clock signals for the operation of controller 501, and a battery power source 504 which operates the controller 501 as well as the solenoid 209 and the circuitry 208 within the lock mechanism housing 201. The electronic key components further include an electronic switch 505 operated by the controller 501 and a power sensing circuit 506.

FIG. 6 is a schematic block diagram of the electronic circuitry 208 within the lock housing 201. This circuitry includes a microprocessor 601, an EEPROM 602 coupled to the microprocessor 601, an oscillator or clock 603 for providing operational clock signals to the microprocessor 601, a power filter 604, electronic switch 605 and load 606 for transmission of signals to the key controller 501 via line 607, and an electronic switch 608 for allowing power to flow from power source 504 within the key housing 104 through cable 107 and contacts 103-206 through the solenoid 209 to ground to activate the solenoid.

Figure 7:
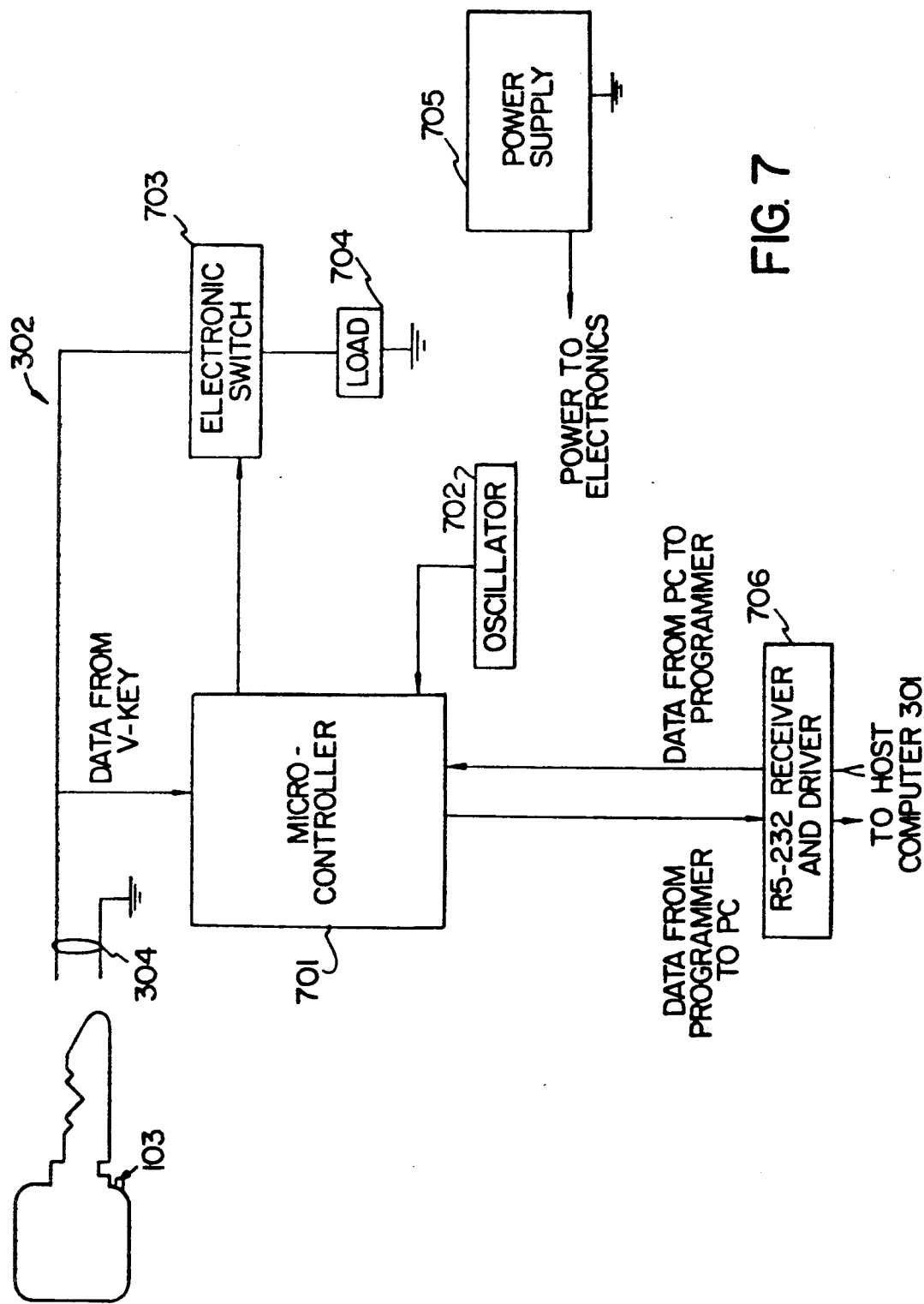
FIG. 7 is a schematic block diagram of the electronic key programmer of FIGS. 3 and 4.

FIG. 7 is a schematic diagram of the electronic key programmer interface unit 302. It is noted that the portable key programmer interface unit 401 contains substantially the same components as the programmer 302, in addition to the modem and telephone jack not shown. The programmer interface unit 302 includes a microcontroller 701, a clock oscillator 702, an electronic switch 703 and load 704 combination which operate similarly to the switch 605 and load 606, a power supply 705, and a standard RS-232 receiver and driver 706 which couples the programmer interface unit 302 to the host computer 301.

The operation of the system components will now be described with reference to FIGS. 5-7.

The electronic key 100 is inserted into the key programmer interface unit 302 or 401 to be programmed by the host computer running the customized software application 305 via cable 107 as described above.

Using the example of a lock for pay telephones for illustration, the EEPROM 502 is loaded with data corresponding to a specific collection route. The data can be entered manually through a keyboard provided with the host computer 301, or the data can be transferred to the EEPROM 502 from files on a floppy disk inserted into a standard floppy disk drive of the computer 301.

EEPROM 502 is loaded with specially encrypted data corresponding to specific ID codes stored in each of the electronic lock memories 602 of the locks on the specific collection route. Data encryption is performed by an encryption algorithm in a known manner. EEPROM 502 also is loaded with the date of key programming, the start date as of which the key is valid, and a time window during which the key can be used, for example, 24, 48 or 72 hours from the start date. EEPROM 502 also contains an address location storing the particular key category, for example, whether the key is a collection key or service key, and a serial number for key identification. The data is encrypted using a specific algorithm performed by the software 305.

The computer 301 may also print out the particular collection route, lock key codes, time window, and start date for confirmation by the programmer.

Controller 501 keeps track of the current time and date by counting the clock inputs of oscillator 503 and using the key programming date as a reference.

The data is written into EEPROM 502 through switching of electronic switch 703 by microcontroller 701 which serves to increase and decrease the amount of power consumed by the load 703 which in turn provides the logic levels for binary "1" and "0" digital communication to the microcontroller 501. This increase and decrease in power is sensed by the power sense circuit 506 and is converted into digital signals readable by the microcontroller 501.

Referring now to FIG. 6, the lock mechanism microprocessor 601 is coupled to EEPROM memory 602 which stores a specific ID code for that specific lock. One important feature of the present invention is that the lock mechanism of FIG. 2 contains no power supply itself but is completely powered by the power source 504 of the electronic key 100. Power filter 604 is provided to supply power to the logic circuits from the key 100 over line 607, the power filter smoothing the voltage waveform so that power interruptions caused by data transmission over line 607 will not affect the operation of the logic circuits.

As an additional security feature, a solenoid activation switch 609 can be mechanically coupled to the bolt blocking plunger 210 of FIG. 2 to detect the retraction of the bolt blocking plunger. In telephones equipped with a so-called "Smart Terminal" or circuit board 610, which is provided with a modem to link the telephone to the host computer over a telephone line, activation switch 609 can be used to send an alarm to the host computer when switch 609 detects the retraction of the bolt blocking plunger in the absence of generation of an enable signal by the microprocessor 601, which would be indicative of someone tampering with the lock by trying to manually pry the bolt blocking plunger away from bolt 202. An additional line 611 may be provided to establish communication between the lock microprocessor and the smart terminal 610.

The use of a smart telephone terminal 610 also allows the use of a host confirmation feature as an additional feature of the present invention. Part of the data stored in the key memory 502 is the key's particular serial number. Using the host confirmation feature, the host computer 301 would dial up the smart terminal 610 via a modem and transmit a host confirmation message to the microprocessor 601. The message may instruct the microprocessor to allow the solenoid 209 to be powered by any mechanically operable key inserted into the key slot 205, may instruct the microprocessor 601 to prevent any key at all from operating the lock by prohibiting powering of the solenoid 209, or may instruct the microprocessor 601 to allow only a key having a particular serial number, transmitted by the host computer, to operate the lock by powering the solenoid. The host confirmation data may then be stored in the memory 602 coupled to the microprocessor 601.

Figure 8:
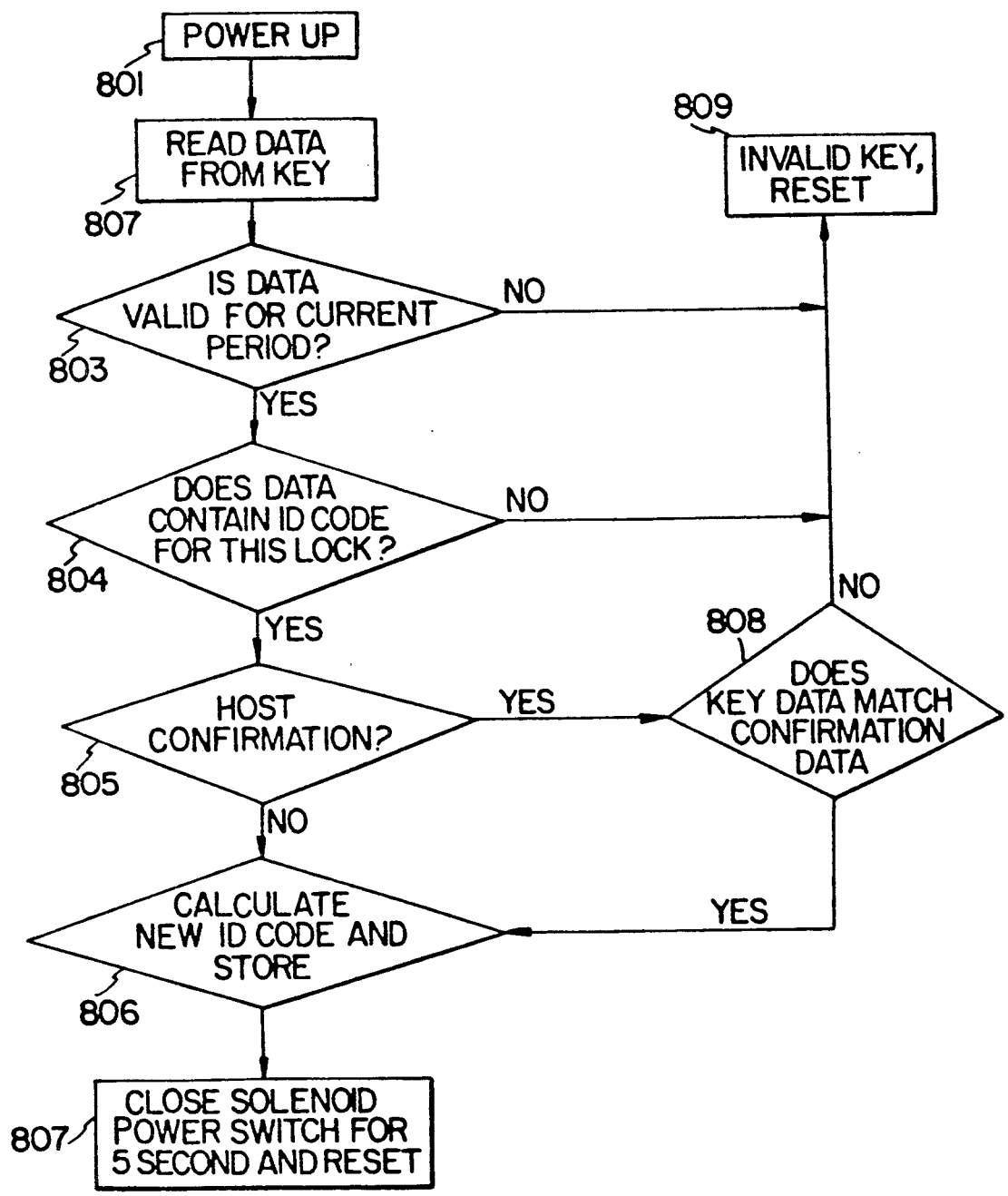
FIG. 8 is an operational flow chart diagram of the electronic lock mechanism operation.

Referring now to FIG. 8, the overall operation of the electronic lock system will be described.

After the key blade 102 is inserted into the keyway 205 and the contact 103 is electrically coupled to the key cylinder contact 206, the electronic lock logic circuitry is powered up or awakened at step 801. At step 802, microprocessor 601 communicates with the microcontroller 501 to read the data stored in the memory 502. At step 803, microprocessor 601 checks whether the current date stored in memory 502 is after the start date written into memory 502 during the programming mode of the key, determines whether the current time read from memory 502 is within the time window stored in memory 502 which has been programmed by the host computer in advance. If the start date read from the key memory is subsequent to the current date read from the key memory, or if the current time is outside of the time window stored in the key memory, the microprocessor advances to step 809 at which the key is determined to be invalid, the microprocessor 601 is reset, and no further action is taken. If the time and date data is valid, the microprocessor 601 proceeds to step 804 in which the list of ID codes stored in key memory 502, corresponding to the locks that key 100 is to operate on this particular collection route, is compared with the current ID code stored in the memory 602. If the ID code in memory 602 is contained in the list stored in memory 502, the process proceeds to step 805 in which the presence of a host confirmation feature is checked. If not, the microprocessor proceeds to step 809. If the telephone is not equipped with a smart terminal 610, processing proceeds to step 806 in which microprocessor 601 calculates a new ID code according to a prestored algorithm in memory 602, encrypts the new ID code and stores it in memory 602, replacing the previous ID code stored therein. At step 807, microprocessor 601 transmits a signal to electronic switch 608 which allows power to flow from power source 504 through solenoid 209, and causes bolt blocking plunger 210 to retract in the direction toward the solenoid 209 for a predetermined period of time such as 5 seconds. At this time, the operator may turn the key body 101 and unlock the bolt. The microprocessor 601 then resets before the key body 101 is withdrawn from the insert slot 205. After the bolt is relocked, the bolt blocking plunger 210 moves back to its blocking position shown in FIG. 2 by spring bias action.

If the coin telephone is one equipped with a smart terminal, processing proceeds from step 805 to step 808. In this step, microprocessor 601 determines whether the key serial number matches the serial number transmitted from the host computer, or whether the host computer has sent a message to prevent all keys from operating. If the key data matches the data stored in the memory 602, processing proceeds to step 806 as described above. If the key data does not match, or microprocessor 601 has received a prohibit message, processing proceeds to step 809.

As an additional feature, each lock may write its serial number and current time into a specific location of the memory 502 of the key in the event that all key data is valid to indicate that the specific lock was operated at the particular time stored with the serial number. Upon return of the key to the central office, the key may be re-inserted into the programmer interface unit 302 and the files in memory 502 read by the host computer in order to maintain a list of the locks that were operated as well as those that were not operated. All of the algorithms utilized by each of the lock microprocessors 601 are stored in the host computer 301 such that after the key is returned at the end of a collection cycle, the key may be reprogrammed with the new ID codes currently being stored in each of the operated locks, while the ID codes for the locks that have not been operated are left unchanged within the key memory 502.

The invention being thus described, it will be apparent to those skilled in the art that the same may be varied in many ways without departing from the spirit and scope of the invention. Any and all such modifications are intended to be included within the scope of the following claims.

What is claimed is:

1. An electronic security system, comprising:
  a lock, including
    a bolt movable between a locked and an unlocked position,
    a key-actuated lock cylinder having a bolt cam in contact with said bolt to prevent said bolt from moving when in a locked position, and operable upon actuation to move said bolt to said unlocked position,
    retractable blocking means for preventing said bolt from moving to said unlocked position when unretracted and allowing said bolt to be moved to said unlocked position when retracted, an electrically powered solenoid operable to retract said blocking means upon switching of power thereto, a microprocessor for controlling the switching of power to said solenoid, and a memory coupled to said microprocessor storing coded data; and key means insertable into said lock cylinder for supplying power to said solenoid to retract said blocking means and for actuating said lock cylinder to move said bolt to said unlocked position, including a power supply for supplying power to said solenoid, a memory storing coded data, a controller for controlling actuation of said power supply and controlling data transfer between said memory and said microprocessor, and means for establishing electrical connection between said controller and said microprocessor through contact terminals in said lock cylinder for transmission of said coded data;

said microprocessor including means for comparing coded data read from said key means with coded data in said coupled memory, and means for enabling said power supply to power said solenoid when said means for comparing has determined that said coded data from said key means matches the coded data in said coupled memory.

2. An electronic security system as set forth in claim 1, wherein said coded data stored in said coupled memory and said key means memory includes ID codes, said microprocessor further comprising means for changing the ID code in said coupled memory after said means for comparing has determined an ID code match.

3. An electronic security system as set forth in claim 2, further comprising:

host computer means for updating the coded data stored in said key means memory; and programmer interface means coupled between said host computer means and said key means for writing said coded data from said host computer means into said key means memory.

4. An electronic security system as set forth in claim 3, wherein said coded data comprises current ID codes for locks accessible by said key means, the start date on which said key means is valid, the date on which the coded data stored in said key means memory was written into said key means memory, and a selected time period during which said key means is to remain valid.

5. An electronic security system as set forth in claim 4, wherein said key means further comprises clock means for determining the current time and date and means for transmitting the current time and date to said microprocessor, and said microprocessor further comprises means for comparing said start date with the current date, means for determining whether the current time is within said selected time period, and means for prohibiting the powering of said solenoid when the start date is invalid and also when the start date is valid and the current time is outside said selected time period.

6. An electronic security system as set forth in claim 1, wherein said coded data stored in said key means memory includes a key serial number, said comparing means comparing said key serial number with a prestored key serial number in said coupled memory and said enabling means enabling said solenoid to be powered upon a serial number match.

7. An electronic security system as set forth in claim 6, wherein said lock further comprises a modem for coupling said microprocessor to a host computer, means for reading coded data transmitted by said host computer, and means for storing said coded data in said coupled memory.

8. An electronic security system as set forth in claim 7, wherein said microprocessor further comprises means for reading an override signal from said host computer and means for enabling said power supply to power said solenoid without comparison of the coded data in said key means memory and said coupled memory.

9. An electronic security system as set forth in claim 7, wherein said microprocessor further comprises means for reading a disable signal from said host computer and means for prohibiting said power supply from powering said solenoid regardless of a match between the coded data in said key means memory and said coupled memory.

10. An electronic security system as set forth in claim 7, further comprising a sensor for sensing the retraction of said blocking means and means for sending a signal to said host computer when said blocking means has been retracted in the absence of a determined coded data match.

11. An electronic security system as set forth in claim 1, wherein said microprocessor further comprises means for writing the time and/or date of access to said lock into the memory of said key means after determination of a coded data match.

12. An electronic security system as set forth in claim 11, further comprising:

host computer means for updating the coded data stored in said key means memory and receiving said time and/or date data stored therein; and programmer interface means coupled between said host computer means and said key means for writing said coded data from said host computer means into said key means memory and reading said time and/or date data from said key means memory to said host computer means.

13. An electronic security system as set forth in claim 12, wherein said programmer interface means is connected to a communication port of said host computer via a cable.

14. An electronic security system as set forth in claim 12, wherein said programmer interface means is connected to a communication port of said host computer via a modem.

* * * * *